United States Patent

Bohnet et al.

[11] Patent Number: 5,271,673
[45] Date of Patent: Dec. 21, 1993

[54] SPRING OPERATED STIRRING APPARATUS

[76] Inventors: Irma M. Bohnet, 15295 Bancroft Rd., Auburn, Calif. 95602; Donn V. Bohnet, 11490 Garnet #4, Auburn, Calif. 95603

[21] Appl. No.: 933,770

[22] Filed: Aug. 24, 1992

[51] Int. Cl.$^5$ .................. B01F 7/16; A47J 43/044; A47J 43/07; H05B 6/78

[52] U.S. Cl. .................. 366/245; 99/348; 99/451; 99/DIG. 14; 219/10.55 E; 219/10.55 F; 366/249

[58] Field of Search .......... 366/197, 242–251, 366/292, 297, 347; 219/10.55 E, 10.55 F; 99/348, 451, DIG. 14

[56] References Cited

U.S. PATENT DOCUMENTS

| | | | |
|---|---|---|---|
| 1,421,932 | 7/1922 | Foster | 366/249 X |
| 3,112,917 | 12/1963 | Woerner | 99/348 X |
| 3,251,581 | 5/1966 | Jensen | 366/285 |
| 3,357,685 | 12/1967 | Stephens | 99/348 X |
| 3,502,848 | 3/1970 | Fink | 99/348 X |
| 3,691,938 | 9/1972 | Nichols | 99/348 |
| 3,697,053 | 10/1972 | Will | 99/348 X |
| 3,783,770 | 1/1974 | Aries | 99/348 |
| 4,151,792 | 5/1979 | Nearhood | 99/348 |
| 4,159,879 | 7/1979 | Coucher | 366/251 X |
| 4,773,317 | 9/1988 | Wickboldt, Jr. | 219/10.55 E X |
| 4,832,501 | 5/1989 | McCauley | 99/348 X |
| 4,959,517 | 9/1990 | Jump et al. | 99/348 X |
| 4,967,939 | 11/1990 | Taylor | 366/136 X |
| 5,013,158 | 5/1991 | Tarlow | 99/348 X |

FOREIGN PATENT DOCUMENTS 370687 3/1923 Fed. Rep. of Germany ...... 366/249

Primary Examiner—Harvey C. Hornsby
Assistant Examiner—Charles Cooley
Attorney, Agent, or Firm—Leon Gilden

[57] ABSTRACT

A stirring apparatus for use in automatic stirring of food components, particularly within a microwave oven, having a bowl formed with a removable lid. The lid includes a spring housing, wherein the spring housing is arranged to effect selective stirring of a blade member within the bowl.

1 Claim, 4 Drawing Sheets

SPRING OPERATED STIRRING APPARATUS

BACKGROUND OF THE INVENTION

1. Field of the Invention

The field of invention relates to stirring apparatus, and more particularly pertains to a new and improved stirring apparatus wherein the same permits stirring of food components within a microwave oven remote from an individual.

2. Description of the Prior Art

Various stirring apparatus has been utilized throughout the prior art as exemplified in the U.S. Pat. No. 4,832,501 to McCauley wherein a motorized stirring device is mounted to a container to effect stirring of food components with an underlying pot.

U.S. Pat. No. 3,502,848 to Fink sets forth a stirring apparatus arranged with a stand for a receptacle during serving forming a part of the stirring apparatus during cooking.

U.S. Pat. No. 4,967,939 to Taylor sets forth a self-stirring pitcher.

U.S. Pat. No. 5,013,158 to Tarlow sets forth a vessel having a stirring member directed within the vessel to effect automatic stirring during a cooking procedure.

U.S. Pat. No. 4,959,517 to Jump, et al. sets forth a microwave cooking assembly utilizing a stirring organization mounted within a lid for positioning within a microwave oven.

As such, it may be appreciated there continues to be a need for a new and improved stirring apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of stirring apparatus now present in the prior art, the present invention provides a stirring apparatus wherein the same employs a spring housing mounted to a lid directing a paddle blade for stirring within an underlying bowl structure. As such, the general purpose of the present invention, which will be described subsequently in greater detail, is to provide a new and improved stirring apparatus which has all the advantages of the prior art stirring apparatus and none of the disadvantages.

To attain this, the present invention provides a stirring apparatus for use in automatic stirring of food components, particularly within a microwave oven, having a bowl formed with a removable lid. The lid includes a spring housing, wherein the spring housing is arranged to effect selective stirring of a blade member within the bowl.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved stirring apparatus which has all the advantages of the prior art stirring apparatus and none of the disadvantages.

It is another object of the present invention to provide a new and improved stirring apparatus which may be easily and efficiently manufactured and marketed.

It is a further object of the present invention to provide a new and improved stirring apparatus which is of a durable and reliable construction.

An even further object of the present invention is to provide a new and improved stirring apparatus which is susceptible of a low cost of manufacture with regard to both materials and labor, and which accordingly is then susceptible of low prices of sale to the consuming public, thereby making such stirring apparatus economically available to the buying public.

Still yet another object of the present invention is to provide a new and improved stirring apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
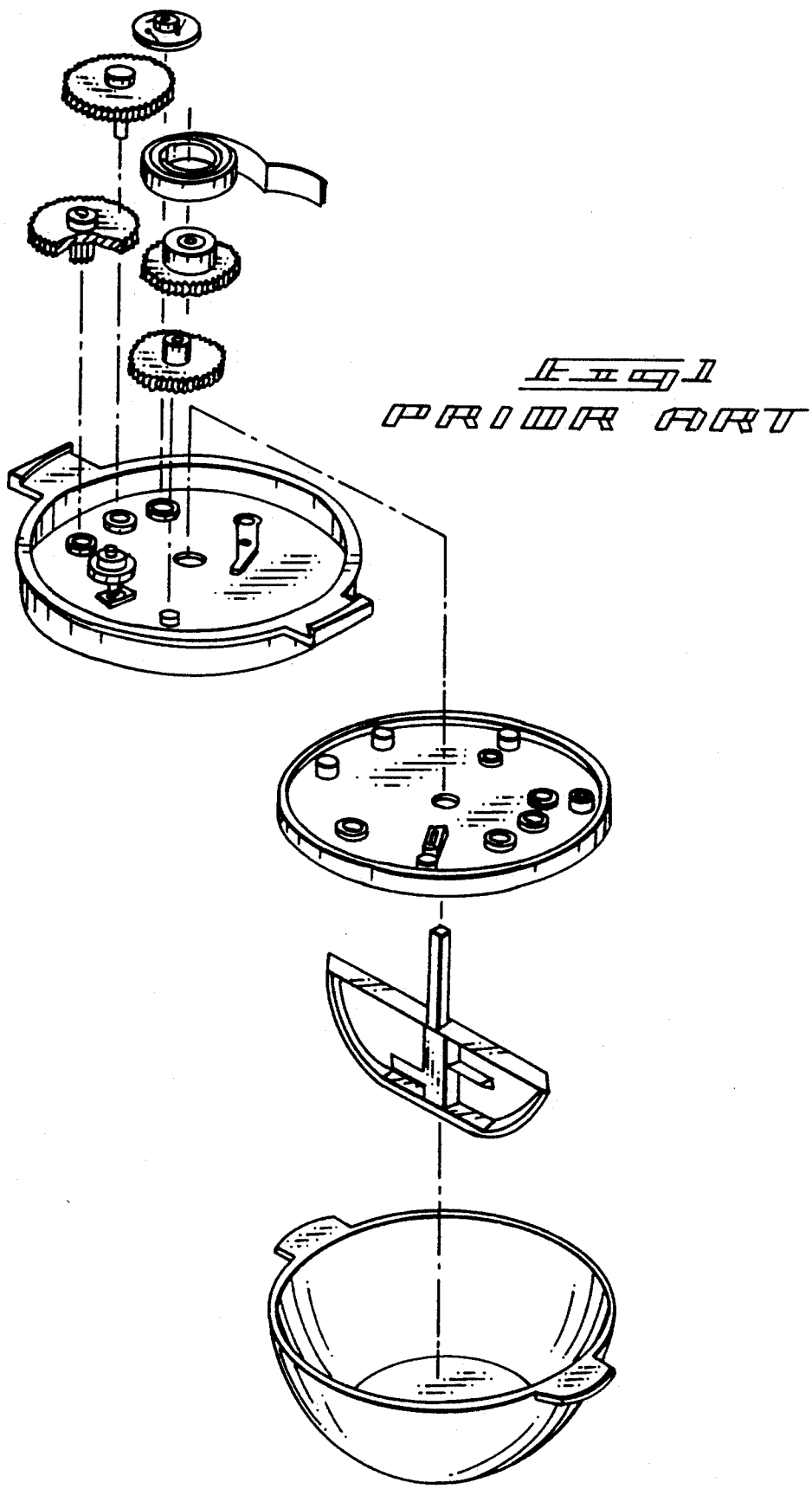
FIG. 1 is an isometric illustration of a prior art structure, as indicated in U.S. Pat. No. 4,959,517.
Figure 2:
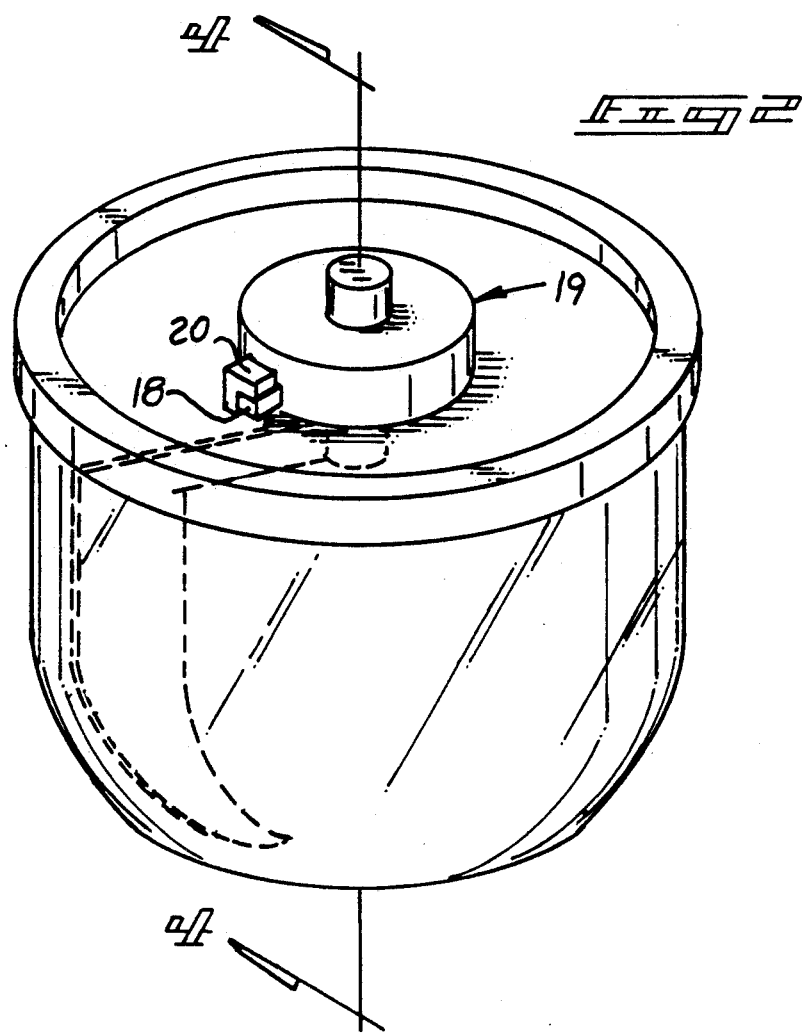
FIG. 2 is an isometric illustration of the invention.
Figure 3:
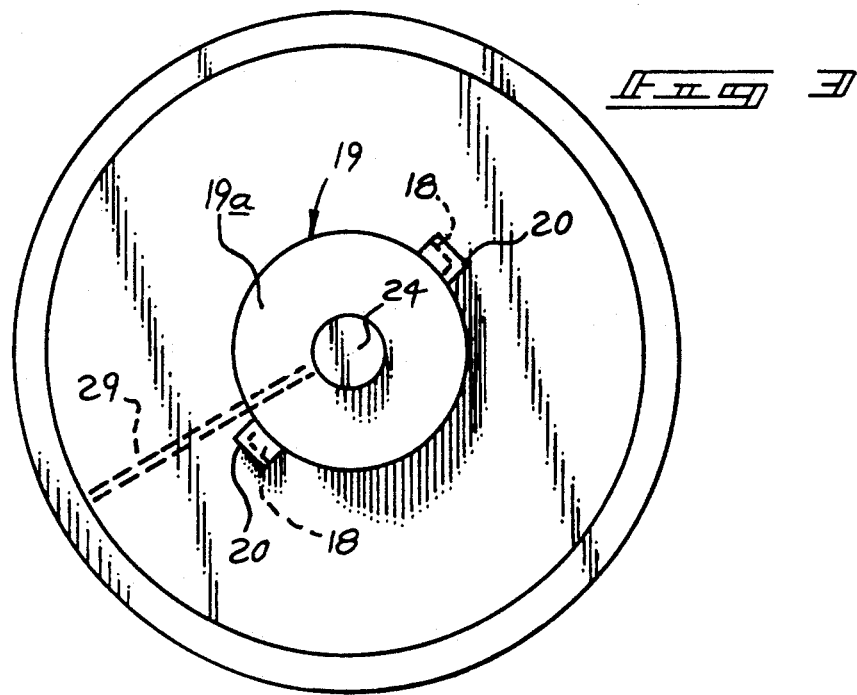
FIG. 3 is an orthographic top view of the invention.
Figure 4:
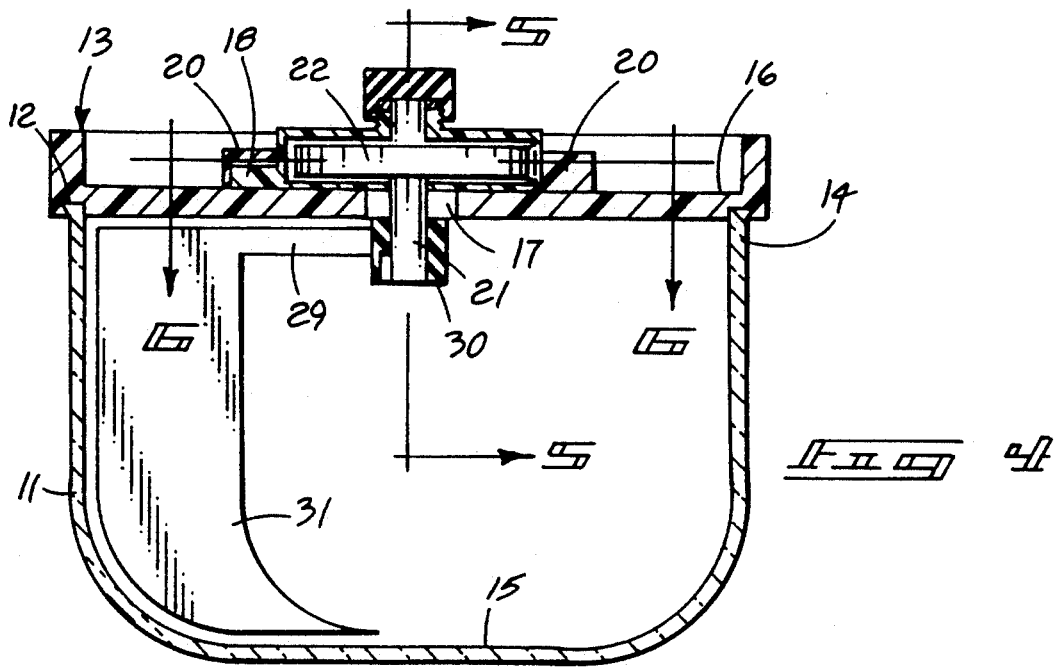
FIG. 4 is an orthographic view, taken along the lines 4—4 of FIG. 3 in the direction indicated by the arrows.
Figure 5:
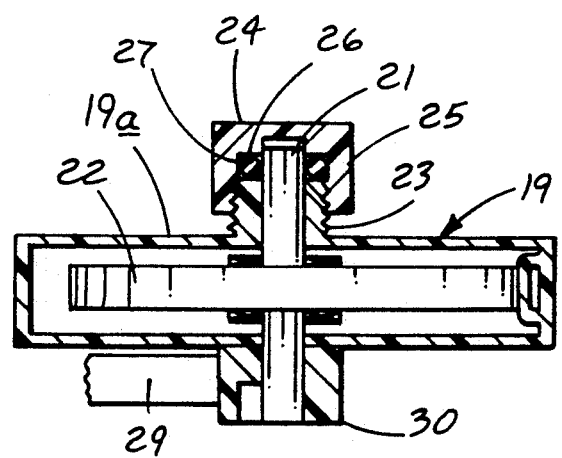
FIG. 5 is an orthographic view, taken along the lines 5—5 of FIG. 4 in the direction indicated by the arrows.
Figure 6:
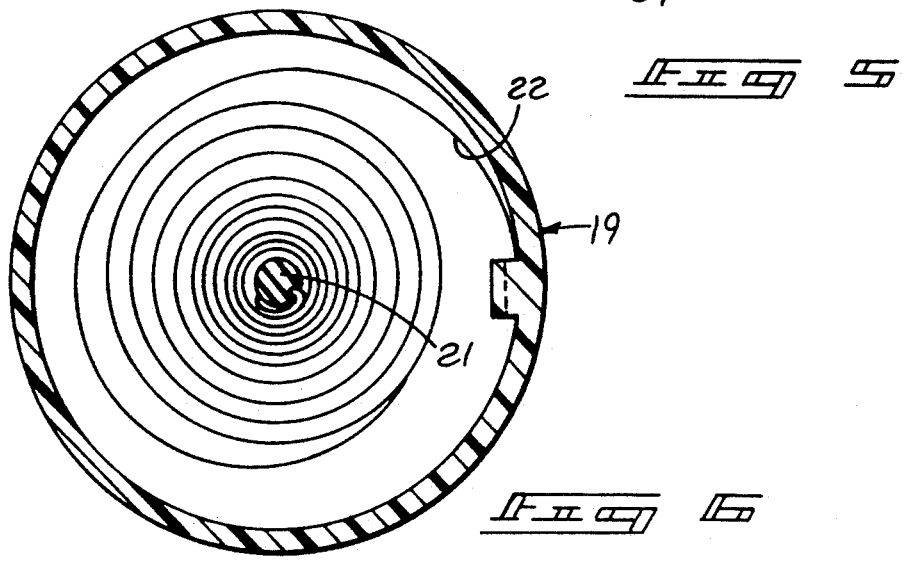
FIG. 6 is an orthographic view, taken along the lines 6—6 of FIG. 4 in the direction indicated by the arrows.

With reference now to the drawings, and in particular to FIGS. 1 to 8 thereof, a new and improved stirring apparatus embodying the principles and concepts of the present invention and generally designated by the reference numeral 10 will be described.

More specifically, the stirring apparatus 10 of the instant invention essentially comprises a bowl member 11 having an upper peripheral edge 12. A lid 13 is provided. The lid 13 includes a lid channel 14 arranged peripherally about the lid 13, with the channel 14 arranged for reception of the peripheral upper edge 12. A lid web 16 is arranged coextensively of the lid within the lid channel, and includes a lid web opening 17 coaxially of the lid web 16 and of the bowl member 11 when the web 16 is secured to the bowl member 11. The lid web 16 includes a plurality of locking flanges 18 diametrically mounted relative to the opening 17 on opposed sides of the opening 17 to receive a spring housing 19 medially between the locking flanges 18, with the spring housing 19 including spring housing locking flanges 20 mounted diametrically on opposed sides of the spring housing 19 for frictional engagement within the lid web locking flanges 18. The spring housing 19 includes an axle 21 orthogonally directed through and coaxially aligned with the spring housing 19, with the axle directed through the spring housing 19 and extending through the lid web opening 17 into the bowl member 11 below the lid 13. The axle extends orthogonally above a spring housing top wall 19a through and beyond a spring housing externally threaded boss 23. As illustrated in the FIGS. 4 and 6 for example, a spring member 22 is wound within the housing 19 in operative communication with one end of the spring member 22 fixed to the housing 19 within the spring housing, and a further end of the spring member 22 secured to the axle 21. An axle cap 24 is provided having an internally threaded cavity 25, with the internally threaded cavity 25 arranged for securement to the externally threaded boss 23. The internally threaded cavity 25 includes a cavity floor 26, with an "0" ring 27 interposed between the cavity floor 26 and the boss 23, whereupon securement and threaded projection of the cap 24 about the boss 23 effects frictional engagement of the axle 21 as the "0" ring 27 is compressed and impinges upon the axle 21 to permit retarding of the rotation of the axle 21 and the associated stirring blade 31. The stirring blade 31 is orthogonally mounted to a stirring blade shaft 29 that in turn is orthogonally mounted to a stirring blade hub 30. The hub 30 is arranged for selective securement to the axle 21 that projects below the lid web 16.

Figure 7:
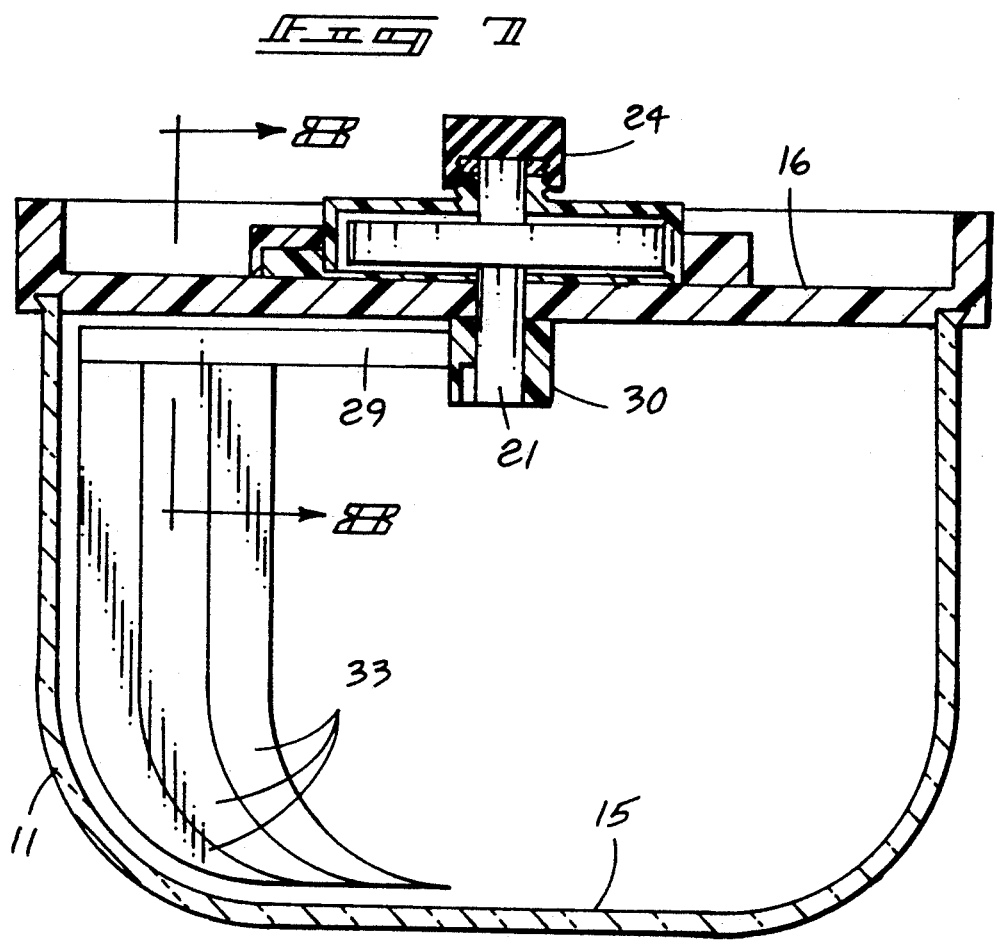
FIG. 7 is an orthographic cross-sectional illustration of a modified aspect of the invention.
Figure 8:
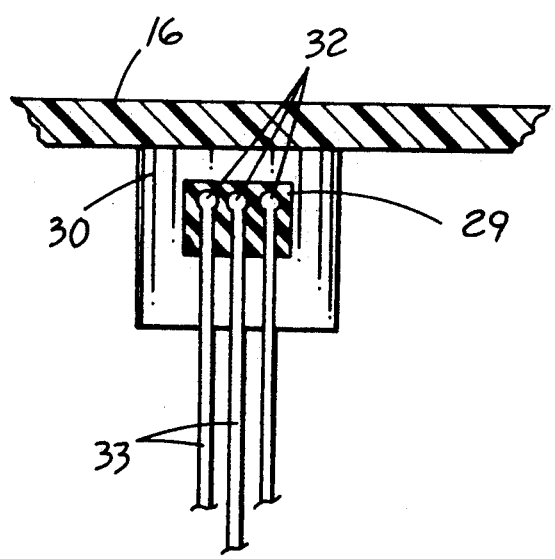
FIG. 8 is an orthographic view, taken along the lines 8—8 of FIG. 7 in the direction indicated by the arrows.

The FIGS. 7 and 8 indicate the use of a plurality of blade plates 33, each having its upper distal end slidably mounted within an individual gi-tide slot 32 of a plurality of such guide slots 32 that are directed coextensively within the blade shaft 29 to permit the relative sliding of the blade plates relative to one another to provide for varying surface area to confront food to be stirred within the bowl member 11.

As to the manner of visage and operation of the instant invention, the same should be apparent from the above disclosure and accordingly, no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A stirring apparatus, comprising, a bowl member, the bowl member having a bowl member upper continuous edge, and a lid, the lid including a lid channel formed about a periphery of the lid, and the lid channel receiving the bowl member upper edge therewithin, and the lid including a lid web arranged coextensively between the channel, and the bowl member having a bowl member floor parallel to the lid web, and the lid web including a lid web opening, and the lid web including a plurality of lid web locking flanges mounted fixedly to the lid web on diametrically opposed sides of the lid web opening, and a spring housing, the spring housing including a plurality of spring housing lock flanges, the spring housing lock flanges frictionally received within the lid web locking flanges, and an axle, the axle rotatably and orthogonally directed through the spring housing medially of the spring housing and coaxially aligned relative to the spring housing and the bowl member, with the axle including an axle lower portion directed through the lid web into the bowl member, and the axle extending orthogonally above the spring housing, and a stirring blade hub mounted to the axle lower portion, and the stirring blade hub including a stirring blade shaft orthogonally and fixedly mounted to the hub and the stirring blade shaft including a stirring blade mounted thereto, and spring means mounted within the spring housing secured to the axle for permitting selective rotation of the axle and the stirring blade relative to the bowl member, and the spring means includes a spring member wound within the spring housing, the spring member having a first end, and the first end fixedly mounted to the spring housing, and the spring member having a second end, with the second end fixedly secured to the axle, and the spring housing having a spring housing top wall, and the spring housing top wall including an externally threaded boss, with the externally threaded boss receiving the axle rotatably directed therethrough, and an axle cap, the axle cap including an internally threaded cavity, and the internally threaded cavity having a cavity floor, with the cavity floor spaced above the externally threaded boss, and an "O" ring captured between the externally threaded boss and the cavity floor, with the axle cap threadedly secured about the externally threaded boss to effect deformation of the "O" ring for selective engagement with the axle, and the stirring blade shaft includes a plurality of parallel guide slots arranged substantially coextensive with the stirring blade shaft, and the stirring blade is arranged for sliding reception with one of said guide slots, and a second stirring blade and a third stirring blade, with the second stirring blade and the third stirring blade each slidably received within one of said guide slots, and the stirring blade, the second stirring blade, and the third stirring blade are arranged parallel relative to one another.

* * * * *